Patented July 13, 1937

UNITED STATES PATENT OFFICE

2,087,134

DICHLORO COMPOUND OF MORPHINE AND PROCESS FOR THE MANUFACTURE OF DESOXYMORPHINE C AND DIHYDRO-DESOXYMORPHINE D

Kurt Warnat, Basel, Switzerland, assignor to Hoffmann-La Roche Inc., Nutley, N. J., a corporation of New Jersey

No Drawing. Application January 20, 1936, Serial No. 59,995. In Germany January 26, 1935

10 Claims. (Cl. 260—25)

Dihydro-desoxymorphine D is prepared from α-chloromorphide, β-chloromorphide and from codeine through the intermediary of dihydro-desoxycodeine D (Journal of the American Chemical Society, vol. 55, 1933, page 3863; United States Patent No. 1,980,972). The chloromorphides, which in any case are difficultly accessible, have to be carefully purified before hydrogenation (Journal of the American Chemical Society, vol. 55, 1933, page 3867 top, and page 3869 middle). It is for this reason that the more complicated method of obtaining dihydro-desoxymorphine D from codeine through the intermediary of dihydro-desoxycodeine D is considered preferable (Journal of the American Chemical Society, vol. 55, 1933, page 3865 middle).

So far desoxymorphine D has only been obtained by the complicated method described in German Patent No. 414,598 from chloro-dihydrocodide or from chloro-dihydromorphide (Journal of the American Chemical Society, vol. 55, 1933, page 2876).

It has now been found, that desoxymorphine C and dihydro-desoxymorphine D may be easily obtained in good yield by allowing concentrated hydrochloric acid to react with morphine at a temperature from 50–70° C. for some time and hydrogenating the heretofore unknown dichloro compound of morphine, $C_{17}H_{19}O_2NCl_2$, after dissolving in alkali, in neutral or acid solution in presence of a catalyst. If the hydrogenation of the dichloro compound of morphine is carried out with base metal catalysts, or in dilute solution in presence of noble metal catalysts, only dihydro-desoxymorphine D will be obtained.

Desoxymorphine C and dihydro-disoxymorphine D are to be used as medicines.

Example 1

1500 parts by weight of morphine hydrochloride are dissolved in 12.000 parts by weight of concentrated hydrochloric acid and kept at about 60° C. in an open receptacle for 80 to 100 hours while stirring. Some hydrochloric acid gas is introduced from time to time to replace the hydrochloric acid consumed. The hydrochloride of the dichloro derivative of morphine, which is formed in very good yield, is removed by suction after cooling, washed with hydrochloric acid and then with water and dried. The new crystalline dichloro compound, which has the formula $C_{17}H_{19}O_2NCl_2 \cdot HCl$, is difficultly soluble in water, hydrochloric acid, alcohol, methyl alcohol, benzene and ether. Its optical rotation is $$[\alpha]_D^{18} = +263°$$

($c=0.346$ in 50 vol. % alcohol).

The mother liquor can be used for the preparation of further quantities of the new compound by dissolving morphine hydrochloride in it and repeating the process.

200 parts by weight of the hydrochloride of the dichloro compound of morphine are dissolved in a solution of 110 parts by weight of potassium hydroxide and 400 parts by weight of water at room temperature and neutralized with hydrochloric acid. With a palladium catalyst the solution is shaken with hydrogen at room temperature until no more hydrogen is taken up. Then the catalyst and the crystallized desoxymorphine-C-hydrochloride are removed. The residue is boiled with water and the catalyst filtered off. On cooling the desoxymorphine-C-hydrochloride crystallizes from the reaction product and is recrystallized from water. The liquid, from which the mixture of catalyst and crystallized desoxymorphine-C-hydrochloride has been removed, yields the dihydro-desoxymorphine D by precipitation with sodium carbonate and exhaustive treatment with ether. For further purification the crude base is transformed into the hydrobromide.

Example 2

200 parts by weight of the hydrochloride of the dichloro compound of morphine, prepared according to the method described in Example 1, are dissolved in a solution of 110 parts by weight of potassium hydroxide and 400 parts by weight of water at room temperature and neutralized with hydrochloric acid. The neutral or slightly acid solution is then diluted to 3–4000 parts by weight and hydrogenated with a palladium-bariumsulphate catalyst. When no more hydrogen is taken up, the catalyst is filtered off. The bases are precipitated with sodium carbonate and taken up with ether. From the ether residue the dihydro-desoxymorphine D is obtained in good yield. A small quantity of tetrahydro-desoxymorphine is formed as by-product.

Example 3

15 parts by weight of the hydrochloride of the dichloro compound of morphine, obtained in the manner described in Example 1, are dissolved in a solution of 10 parts by weight of potassium hydroxide and 100 parts of water and hydrogenated in the presence of a nickel catalyst at room temperature. When no more hydrogen is taken up, the catalyst is filtered off and the alkaline solution precipitated with bicarbonate. By exhaustive treatment with ether the dihydro-desoxymorphine D is obtained.

I claim:

1. The crystallized hydrochloride of a dichloro compound of morphine of the formula $C_{17}H_{19}O_2NCl_2.HCl$, which is difficultly soluble in water, hydrochloric acid, alcohol, methyl alcohol, benzene and ether, its optical rotation being $$[\alpha]_D^{18} = +263°$$

$c = 0.346$ in 50 vol. % alcohol).

2. The process for the manufacture of desoxymorphine C and dihydro-desoxymorphine D, which consists in allowing concentrated hydrochloric acid to react with morphine at a temperature from 50–70° C. until a dichloro compound of morphine is obtained and hydrogenating the dichloro compound of morphine thus obtained, after dissolving in alkali, in presence of a catalyst.

3. The process for the manufacture of desoxymorphine C and dihydro-desoxymorphine D, which consists in allowing concentrated hydrochloric acid to react with morphine at a temperature from 50–70° C. until a dichloro compound of morphine is obtained and hydrogenating the dichloro compound of morphine thus obtained, after dissolving in alkali, in concentrated solution in presence of a catalyst.

4. The process for the manufacture of desoxymorphine C and dihydro-desoxymorphine D, which consists in allowing concentrated hydrochloric acid to react with morphine at a temperature from 50–70° C. until a dichloro compound of morphine is obtained and hydrogenating the dichloro compound of morphine thus obtained, after dissolving in alkali, in concentrated solution in presence of noble metal catalysts.

5. The process for the manufacture of desoxymorphine C and dihydro-desoxymorphine D, which consists in allowing concentrated hydrochloric acid to react with morphine at a temperature from 50–70° C. until a dichloro compound of morphine is obtained and hydrogenating the dichloro compound of morphine thus obtained, after dissolving in alkali, in concentrated acid or neutral solution in presence of noble metal catalysts.

6. The process for the manufacture of desoxymorphine C and dihydro-desoxymorphine D, which consists in allowing concentrated hydrochloric acid to react with morphine at a temperature from 50–70° C. until a dichloro compound of morphine is obtained and hydrogenating the dichloro compound of morphine thus obtained, after dissolving in alkali, in concentrated acid or neutral solution in presence of palladium as catalyst.

7. The process for the manufacture of desoxymorphine C and dihydro-desoxymorphine D, which consists in allowing concentrated hydrochloric acid to react with morphine at a temperature from 50 to 70° C. until a dichloro compound of morphine is obtained and hydrogenating the dichloro compound of morphine thus obtained, after dissolving in alkali, in concentrated alkaline solution in presence of base metal catalysts.

8. The process for the manufacture of desoxymorphine C and dihydro-desoxymorphine D, which consists in allowing concentrated hydrochloric acid to react with morphine at a temperature from 50 to 70° C. until a dichloro compound of morphine is obtained and hydrogenating the dichloro compound of morphine thus obtained, after dissolving in alkali, in concentrated alkaline solution in presence of a nickel catalyst.

9. The process for the manufacture of desoxymorphine C and dihydro-desoxymorphine D, which consists in allowing concentrated hydrochloric acid to react with morphine at a temperature from 50 to 70° C. until a dichloro compound of morphine is obtained and hydrogenating the dichloro compound of morphine thus obtained, after dissolving in alkali, in dilute acid or neutral solution in presence of noble metal catalysts.

10. The process for the manufacture of desoxymorphine C and dihydro-desoxymorphine D, which consists in allowing concentrated hydrochloric acid to react with morphine at a temperature from 50 to 70° C. until a dichloro compound of morphine is obtained and hydrogenating the dichloro compound of morphine thus obtained, after dissolving in alkali, in dilute acid or neutral solution in presence of palladium as catalyst.

KURT WARNAT.